(12) United States Patent
Li (10) Patent No.: US 12,382,517 B2
(45) Date of Patent: Aug. 5, 2025

(54) POWER SAVING METHOD, TERMINAL, ACCESS NETWORK DEVICE, AND READABLE STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 850 days.

(21) Appl. No.: 17/629,339

(22) PCT Filed: Jul. 26, 2019

(86) PCT No.: PCT/CN2019/098026
§ 371 (c)(1),
(2) Date: Jan. 21, 2022

(87) PCT Pub. No.: WO2021/016766
PCT Pub. Date: Feb. 4, 2021

(65) Prior Publication Data
US 2022/0256622 A1    Aug. 11, 2022

(51) Int. Cl.
*H04W 4/00* (2018.01)
*H04W 52/02* (2009.01)
*H04W 76/10* (2018.01)

(52) U.S. Cl.
CPC ....... *H04W 76/10* (2018.02); *H04W 52/0229* (2013.01)

(58) Field of Classification Search
CPC ............. H04W 76/10; H04W 52/0229; H04W 52/0235; H04W 52/028; H04W 76/28; H04W 52/0216; H04W 24/02
See application file for complete search history.

(56) References Cited

U.S. PATENT DOCUMENTS

2020/0092814 A1* 3/2020 Zhou .................. H04W 52/0235
2020/0314748 A1* 10/2020 Kim ..................... H04W 74/006

FOREIGN PATENT DOCUMENTS

CN    109923904 A    6/2019

OTHER PUBLICATIONS

LG Electronics. "Numerical Results for UE Power Savings Schemes" 3GPP TSG RAN WG1 #96 R1-1902052, Feb. 2019, 9 pages.
LG Electronics. "Numerical Results for UE Power Savings Schemes" 3GPP TSG RAN WG1 Ad-Hoc Meeting R-1900598, Jan. 2019, 12 pages.
PCT/CN2019/098026 International Search Report dated Apr. 24, 2020, 2 pages.

(Continued)

*Primary Examiner* — Omoniyi Obayanju
(74) *Attorney, Agent, or Firm* — Cozen O'Connor (57) ABSTRACT

A power saving method, a terminal, an access network device, and a readable storage medium, pertains to the field of communications, wherein the method includes: performing, by a terminal, physical downlink control channel (PDCCH) monitoring on a duration timer within a first number N1 of DRX cycles in response to detecting a power saving signal; skipping, by the terminal, the PDCCH monitoring on a duration timer within a second number N2 of DRX cycles in response to detecting no wake up signaling. The first number N1 and the second number N2 are identical or different.

17 Claims, 4 Drawing Sheets (56) References Cited

OTHER PUBLICATIONS

European Patent Application No. 19939348.9, Search and Opinion dated Jun. 30, 2022, 10 pages.
Huawei, HiSilicon "Signaling based mechanisms for UE power saving"; 3GPP TSG RAN WGI Meeting #94bis; RI-1810155; Oct. 2018; 7 pages.
Indian Patent Application No. 202247010009, Office Action dated Jul. 7, 2022, 7 pages.

* cited by examiner

POWER SAVING METHOD, TERMINAL, ACCESS NETWORK DEVICE, AND READABLE STORAGE MEDIUM

CROSS-REFERENCE TO RELATED APPLICATIONS

This application is a U.S. national phase of International Application No. PCT/CN2019/098026, filed on Jul. 26, 2019, the entire contents of which are incorporated herein by reference.

TECHNICAL FIELD

The present disclosure relates to a field of communications, and more particularly, to a power saving method, an apparatus, a terminal, an access network device, and a readable storage medium.

BACKGROUND

In the fifth-generation mobile communication technology (5G) new radio (NR) system and the long-term evolution (LTE) system, an enhancement mechanism of the discontinuous reception (DRX) is being discussed. The basic mechanism of DRX is to configure a DRX cycle for user equipment (UE) in a radio resource control (RRC) connected state. The DRX cycle is composed of "on duration" and "opportunity for DRX".

During the "on duration", the terminal monitors and receives a physical downlink control channel (PDCCH). During the "opportunity for DRX", the terminal skips monitoring the PDCCH to reduce power consumption. Since the terminal is only scheduled opportunistically during the periodically occurring "on duration", there are cases where most PDCCH detections within the "on duration" do not detect data scheduling, resulting in a waste of detection power. In order to solve this problem, a power saving signal (WUS) is introduced. When a base station determines that the terminal needs to be scheduled within the "on duration", a power saving signal is first transmitted to the terminal. When the terminal detects the power saving signal, it means that the PDCCH is to be monitored in the next "on duration" of the DRX. When the power saving signal is not detected by the terminal, it means that the monitoring of the PDCCH is to be skipped in the next "on duration" of the DRX.

The related art has not yet solved the problem of how to configure the power saving signal in different DRX scenarios to adapt to different power saving requirements.

SUMMARY

According to an aspect, a power saving method is provided. The method includes: performing, by a terminal, physical downlink control channel (PDCCH) monitoring on a duration timer within a first number N1 of DRX cycles in response to detecting a power saving signal; skipping, by the terminal, the PDCCH monitoring on a duration timer within a second number N2 of DRX cycles in response to detecting no wake up signaling. The first number N1 and the second number N2 are identical or different.

In an optional embodiment, the first number N1 is a pre-configured value.

In an optional embodiment, a default value of the second number N2 is identical to the first number N1; or, the default value of the second number N2 is 1.

In an optional embodiment, the method further includes: receiving, by the terminal, a dedicated signaling sent by an access network device, wherein the dedicated signaling is configured to configure the first number N1 and/or the second number N2. The dedicated signaling includes any of: a radio resource control (RRC) signaling, a media access control (MAC) control unit (CE), and downlink control information (DCI).

In an optional embodiment, the first number N1 is greater than 1, and the second number N2 is equal to 1; or, the first number N1 is equal to 1, and the second number N2 is greater than 1; or, the first number N1 is greater than 1, and the second number N2 is greater than 1.

In an optional embodiment, a long DRX cycle and a short DRX cycle are configured with different first numbers N1; or, the long DRX cycle and the short DRX cycle are configured with different second numbers N2; or, the long DRX cycle and the short DRX cycle are configured with different first numbers N1 and different second numbers N2.

In an optional embodiment, different entry modes of a short DRX cycle are configured with different first numbers N1; or, different entry modes of a short DRX cycle are configured with different second numbers N2; or, different entry modes of a short DRX cycle are configured with different first numbers N1 and different second numbers N2.

According to another aspect, a power saving method is provided. The method includes: sending, by an access network device, a dedicated signaling configured to configure a first number N1 and/or a second number N2 to a terminal. The first number N1 is configured to indicate performing physical downlink control channel (PDCCH) monitoring on a duration timer within the first number N1 of DRX cycles in response to detecting a power saving signal. The second number N2 is configured to indicate skipping the PDCCH monitoring on a duration timer within the second number N2 of DRX cycles in response to detecting no wake up signaling. The dedicated signaling includes any of: a radio resource control (RRC) signaling, a media access control (MAC) control unit (CE), and downlink control information (DCI). The first number N1 and the second number N2 are identical or different.

In an optional embodiment, sending by the access network device the dedicated signaling configured to configure the first number N1 and/or the second number N2 to the terminal includes: sending, by the access network device, the dedicated signaling configured to configure the first number N1 to the terminal. The second number N2 is a default value.

In an optional embodiment, the first number N1 is greater than 1, and the second number N2 is equal to 1; or, the first number N1 is equal to 1, and the second number N2 is greater than 1; or, the first number N1 is greater than 1, and the second number N2 is greater than 1.

In an optional embodiment, a long DRX cycle and a short DRX cycle are configured with different first numbers N1; or, the long DRX cycle and the short DRX cycle are configured with different second numbers N2; or, the long DRX cycle and the short DRX cycle are configured with different first numbers N1 and different second numbers N2.

In an optional embodiment, different entry modes of a short DRX cycle are configured with different first numbers N1; or, different entry modes of a short DRX cycle are configured with different second numbers N2; or, different entry modes of a short DRX cycle are configured with different first numbers N1 and different second numbers N2.

According to another aspect, a power saving apparatus is provided. The apparatus is configured in a terminal. The apparatus includes: a processing module, configured to perform physical downlink control channel (PDCCH) monitoring on a duration timer within a first number N1 of DRX cycles in response to detecting a power saving signal. The processing module is further configured to skip the PDCCH monitoring on a duration timer within a second number N2 of DRX cycles in response to detecting no wake up signaling. The first number N1 and the second number N2 are identical or different.

In an optional embodiment, the first number N1 is a pre-configured value.

In an optional embodiment, a default value of the second number N2 is identical to the first number N1; or, the default value of the second number N2 is 1.

In an optional embodiment, the apparatus further includes: a receiving module, configured to receive a dedicated signaling sent by an access network device. The dedicated signaling is configured to configure the first number N1 and/or the second number N2. The dedicated signaling includes any of: a radio resource control (RRC) signaling, a media access control (MAC) control unit (CE), and downlink control information (DCI).

In an optional embodiment, the first number N1 is greater than 1, and the second number N2 is equal to 1; or, the first number N1 is equal to 1, and the second number N2 is greater than 1; or, the first number N1 is greater than 1, and the second number N2 is greater than 1.

In an optional embodiment, a long DRX cycle and a short DRX cycle are configured with different first numbers N1; or, the long DRX cycle and the short DRX cycle are configured with different second numbers N2; or, the long DRX cycle and the short DRX cycle are configured with different first numbers N1 and different second numbers N2.

In an optional embodiment, different entry modes of a short DRX cycle are configured with different first numbers N1; or, different entry modes of a short DRX cycle are configured with different second numbers N2; or, different entry modes of a short DRX cycle are configured with different first numbers N1 and different second numbers N2.

According to another aspect, a power saving apparatus is provided. The apparatus is configured in an access network device. The apparatus includes: a sending module, configured to send a dedicated signaling configured to configure a first number N1 and/or a second number N2 to a terminal. The first number N1 is configured to indicate performing physical downlink control channel (PDCCH) monitoring on a duration timer within the first number N1 of DRX cycles in response to detecting a power saving signal. The second number N2 is configured to indicate skipping the PDCCH monitoring on a duration timer within the second number N2 of DRX cycles in response to detecting no wake up signaling. The dedicated signaling includes any of: a radio resource control (RRC) signaling, a media access control (MAC) control unit (CE), and downlink control information (DCI). The first number N1 and the second number N2 are identical or different.

In an optional embodiment, the sending module is further configured to send the dedicated signaling configured to configure the first number N1 to the terminal. The second number N2 is a default value.

In an optional embodiment, the first number N1 is greater than 1, and the second number N2 is equal to 1; or, the first number N1 is equal to 1, and the second number N2 is greater than 1; or, the first number N1 is greater than 1, and the second number N2 is greater than 1.

In an optional embodiment, a long DRX cycle and a short DRX cycle are configured with different first numbers N1; or, the long DRX cycle and the short DRX cycle are configured with different second numbers N2; or, the long DRX cycle and the short DRX cycle are configured with different first numbers N1 and different second numbers N2.

In an optional embodiment, different entry modes of a short DRX cycle are configured with different first numbers N1; or, different entry modes of a short DRX cycle are configured with different second numbers N2; or, different entry modes of a short DRX cycle are configured with different first numbers N1 and different second numbers N2.

According to another aspect, a terminal is provided. The terminal includes: a processor; and a transceiver coupled to the processor. The processor is configured to load and execute executable instructions to implement the power saving method according to above embodiments of the disclosure.

According to another aspect, an access network device is provided. The access network device includes: a processor; and a transceiver coupled to the processor. The processor is configured to load and execute executable instructions to implement the power saving method according to above embodiments of the disclosure.

According to another aspect, a non-transitory computer-readable storage medium is provided. The storage medium has stored therein at least one instruction, at least one program, a code set, or an instruction set. The at least one instruction, the at least one program, the code set, or the instruction set is loaded and executed by a processor to implement the power saving method according to above embodiments of the disclosure.

Beneficial effects brought by the technical solution provided in embodiments of the present disclosure may at least include the following.

BRIEF DESCRIPTION OF THE DRAWINGS

In order to explain the technical solutions in embodiments of the present disclosure more clearly, the accompanying drawings described in the embodiments will be briefly introduced below. Obviously, the accompanying drawings described below are only some embodiments of the present disclosure. Those skilled in the art may obtain other drawings from these drawings without creative work.

DETAILED DESCRIPTION

Embodiments of the disclosure are further described in combination with the accompanying drawings in order to make the purpose, the technical solution and advantages of the disclosure more clear.

Figure 1:
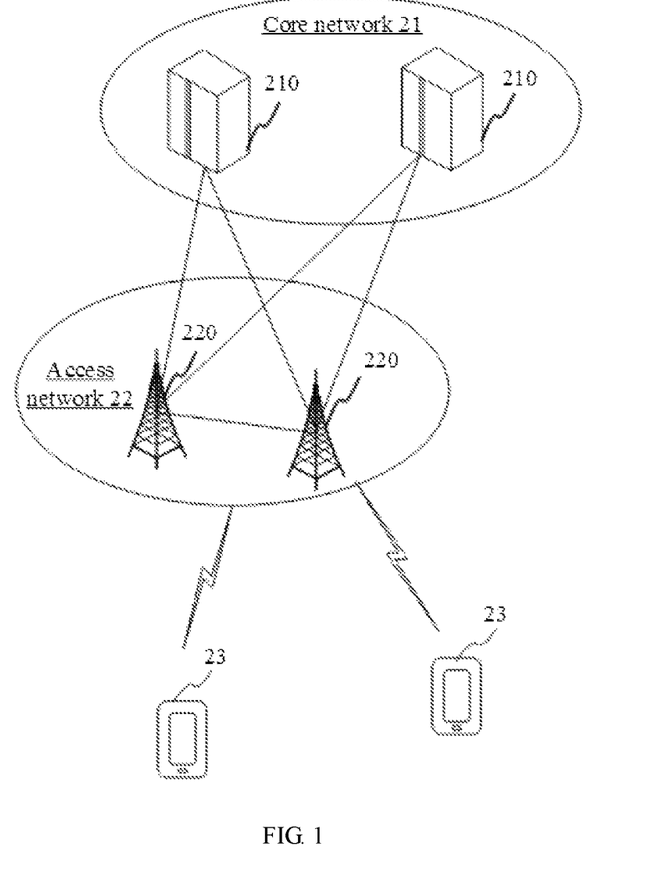
FIG. 1 is a block diagram illustrating a communication system provided in an exemplary embodiment of the disclosure.

FIG. 1 is a block diagram illustrating a communication system provided in an exemplary embodiment of the disclosure. The communication system may include a core network 21, an access network 22, and a terminal 23.

The core network 21 includes multiple core network devices 210. The core network devices 210 include devices for an access and mobility management function (AMF), a session management function (SMF), and a user plane function (UPF), etc. The AMF is used to control access authorities and functions such as handover of the terminal. The SMF is used to provide server continuity and uninterrupted user experience of the server, such as: IP address and anchor point changes.

The access network 22 includes multiple access network devices 220. The access network device 220 may be a base station, which is an apparatus deployed in an access network to provide a wireless communication function for a terminal. The base station may include various forms of macro base stations, micro base stations, relay stations, access points, etc. In systems adopting different wireless access technologies, the names of devices with a base station function may be different. For example, in an LTE (long term evolution) system, it is referred to as eNodeB or eNB. In a 5G NR (new radio) system, it is referred to as gNodeB or gNB. With evolution of communication technologies, possible descriptions of the term "base station" may vary. For convenience of description, in embodiments of the present disclosure, the above apparatus that provides the wireless communication function for the terminal is collectively referred to as an access network device.

The terminal 23 may include various handheld devices, vehicle devices, wearable devices, computing devices with a wireless communication function or other processing devices connected to a wireless modem, as well as various forms of user equipment (UE), mobile stations (MS), terminal devices, etc. For convenience of description, the above devices are collectively referred to as a terminal. The access network device 220 and the terminal 23 communicate with each other through some kind of air interface technology, for example, a Uu interface.

Firstly, technical terms involved in the embodiments of the present discloser are briefly introduced.

Discontinuous reception (DRX): DRX may allow the UE to enter a sleep period periodically, skipping the monitoring of physical downlink control channel (PDCCH) scheduling information (or known as PDCCH subframe). When the UE is to monitor the PDCCH scheduling information, the UE is waken up from the sleep period. This can make the UE achieve the purpose of power saving.

Figure 2:
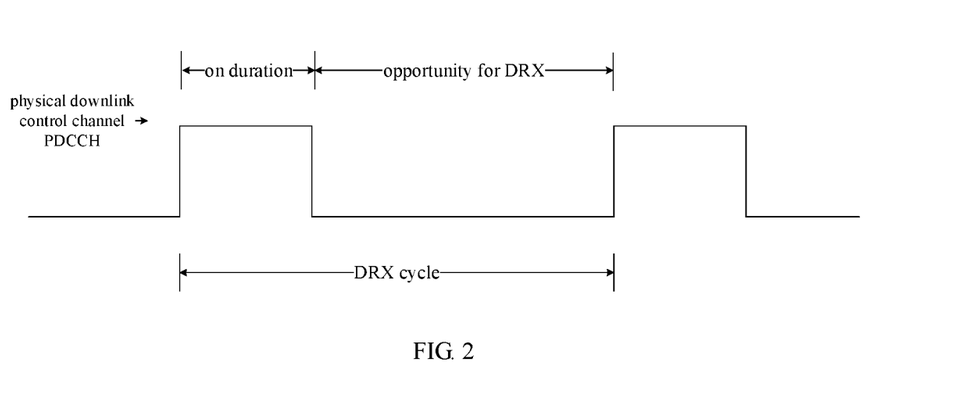
FIG. 2 is a schematic diagram illustrating a discontinuous reception (DRX) mechanism provided in an exemplary embodiment of the disclosure.

The basic mechanism of the DRX is to configure a DRX cycle for the UE in a radio resource control connected (RRC CONNECTED) state. The DRX cycle is composed of "on duration" and "opportunity for DRX". During the "on duration" period, the UE monitors and receives PDCCH scheduling information. During the "opportunity for DRX" period, the UE does not receive data of the downlink channel to save power consumption. As can be seen from FIG. 2, in time domain, time is divided into successive DRX cycles. When the UE receives a scheduling message during the "on duration" period, the UE may start a DRX-inactivity timer and monitor the PDCCH scheduling information in each subframe of the period. When the DRX-inactivity timer is running, even if the originally configured "on duration" period has expired, the UE still continues to monitor the downlink PDCCH subframes until the DRX-inactivity timer expires.

A DRX cycle is equal to a sum of a wake-up time period and a sleep time period of UE. The wake-up time period is a duration of the "on duration" within a cycle, that is, a timing duration of a duration timer, and the sleep time period is a duration of the "opportunity for DRX" within a cycle.

Power saving signal: In 5G and the LTE program, an enhancement mechanism of the DRX is being discussed. For example, although the network has configured the DRX mechanism for the terminal, the terminal is only scheduled opportunistically during the periodically occurring "on duration", even scheduled only in a few DRX cycles when the traffic load of the terminal is very low. For a paging message using the DRX mechanism, the terminal has less opportunity to receive the paging message. Therefore, after the terminal is configured with the DRX mechanism, there are still most PDCCH detections in the "on duration" with no data scheduling detected. When the terminal blindly detects the PDCCH when there is no data scheduling, the power for the detection is wasted. Therefore, there is room for further optimization for the current DRX mechanism. The power saving signal is also called an energy saving signal. The power saving signal includes a wake up signaling (WUS), but the power saving signal is not limited to the WUS. It can also be a ZC (Zaddoff Chu) sequence or other possible implementations such as a predetermined bit position in downlink control information (DCI).

Currently, one solution is that, when a base station determines that the terminal is to be scheduled in DRX on duration, it sends a power saving signal to the terminal. The power saving signal is used to wake up the terminal so that the terminal performs PDCCH detection in the on duration of DRX; otherwise, when the base station determines that it is not necessary to schedule the terminal in the DRX on duration, the terminal may be instructed to not perform the PDCCH detection in the on duration of DRX.

In addition, it is found during research that, in addition to waking up the terminal to detect the PDCCH, the power saving signal may also be used to indicate a target BWP used when the terminal wakes up, configuration of a used PDCCH search space, and other information. In the embodiments of the present disclosure, the function of the power saving signal may include all or part of the above functions, or may include functions not shown in the above functions, which is not limited.

Figure 3:
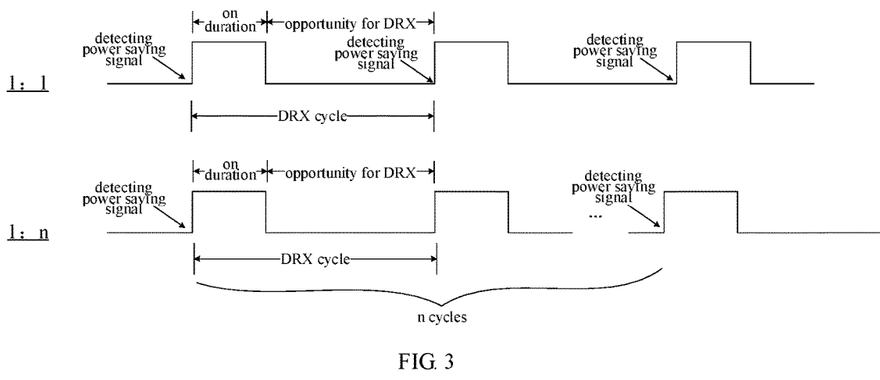
FIG. 3 is a schematic diagram illustrating a frequency of monitoring physical downlink control channel (PDCCH) provided in an exemplary embodiment of the disclosure.

In a scenario where DRX is configured, the power saving signal is usually configured before the DRX on duration. When the UE detects no power saving signal, the entire on duration of DRX is to be skipped. A frequency of skipping the DRX on duration by the power saving signal may be 1 or an integer greater than 1. As shown in FIG. 3, when the frequency is 1, the UE detects the power saving signal before the on duration of each DRX cycle, and determines whether to perform PDCCH monitoring on the on duration of the DRX cycle according to a detection result of the power saving signal. When the frequency is n, after the UE detects the power saving signal before the on duration of a DRX cycle, the UE determines whether to perform PDCCH monitoring on the on duration of n DRX cycles according to the power saving signal.

Figure 4:
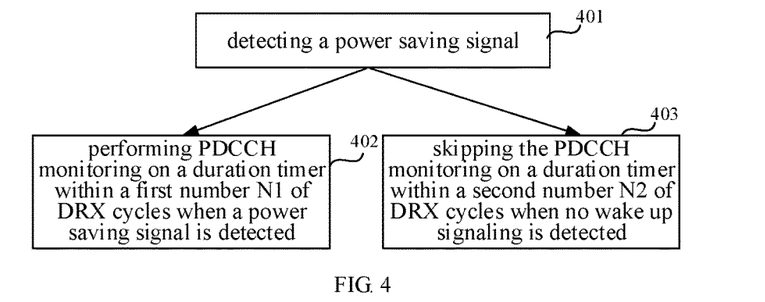
FIG. 4 is a flow chart illustrating a power saving method provided in another exemplary embodiment of the disclosure.

FIG. 4 is a flow chart illustrating a power saving method provided in another exemplary embodiment of the disclosure. In this embodiment, performing the method by the terminal illustrated in FIG. 1 is taken as an example for description. As illustrated in FIG. 4, the method includes the following.

At block 401, detection for a power saving signal is performed.

The power saving signal is usually configured before the DRX on duration. The power saving signal is used to indicate whether to perform the PDCCH monitoring in the DRX on duration. When the power saving signal is detected, it indicates that the PDCCH monitoring is to be performed in the DRX on duration. When no power saving signal is detected, it indicates that the PDCCH monitoring in the DRX on duration is skipped.

A detection mode of the power saving signal is pre-configured, or the detection mode of the power saving signal is pre-defined. That is, the detection mode of the power saving signal may be notified to the UE through a system message or a dedicated signaling method, or may be pre-defined in a manner prescribed by an agreement.

At block 402, PDCCH monitoring is performed on a duration timer within a first number N1 of DRX cycles when the power saving signal is detected.

The first number N1 is used to indicate the number of cycles of DRX on duration for performing the PDCCH monitoring when the power saving signal is detected.

Optionally, the first number N1 is a pre-configured value. That is, the terminal receives a dedicated signaling sent by the access network device, the dedicated signaling is used to configure the first number N1, and the dedicated signaling includes any one of: a radio resource control (RRC) signaling, a media access control element (MAC CE) and DCI.

Optionally, the first number N1 may also be a predefined value.

The value of the first number N1 may be 1, or may be greater than 1.

When the power saving signal is detected, the PDCCH scheduling information (or known as PDCCH subframe) is monitored for the duration timer within the first number N1 of DRX cycles.

At block 403, the PDCCH monitoring is skipped for a duration timer within a second number N2 of DRX cycles when no power saving signal is detected.

The second number N2 is used to indicate the number of cycles of DRX on duration where the PDCCH monitoring is skipped when no power saving signal is detected.

The second number N2 may be a default value or a pre-configured value.

When the second number N2 is a default value, the default value of the second number N2 is the same as the first number N1, or, the default value of the second number N2 is 1.

When the second number N2 is a pre-configured value, the terminal receives dedicated signaling sent by the access network device, the dedicated signaling is used to configure the second number N2, and the dedicated signaling includes any one of: RRC signaling, an MAC CE and DCI.

The value of the second number N2 may be 1 or greater than 1.

Optionally, when the first number N1 is greater than 1, the second number N2 is equal to 1, that is, PDCCH monitoring is to be continuously performed in multiple DRX on durations when the power saving signal is detected, but the PDCCH monitoring in 1 DRX on duration (i.e., the current DRX on duration) is skipped when no power saving signal is detected; or, when the first number N1 is equal to 1, the second number N2 is greater than 1, that is, the PDCCH monitoring in one DRX on duration (i.e., the current DRX on duration) when the power saving signal is detected, and the PDCCH monitoring in multiple DRX on durations is skipped when no power saving signal is detected; or, the first number N1 is greater than 1 and the second number N2 is also greater than 1, the first number N1 and the second number N2 may be equal, or the first number N1 may be greater than the second number N2, or the second number N2 may be greater than the first number N1.

In conclusion, with the method provided in the embodiments, by using the first number N1 and the second number N2 to respectively indicate the monitoring cycle when the power saving signal is detected and the skipping period when no power saving signal is detected, thus, the density of monitoring the PDCCH is adjusted, by adapting to different power-saving requirements with different monitoring densities, the effectiveness to save power of the terminal using the power saving signal is improved.

In the method provided in the embodiments, when the first number N1 is greater than 1, the second number N2 is equal to 1, that is, PDCCH monitoring is to be continuously performed on multiple DRX on durations when the power saving signal is detected, but the PDCCH monitoring in 1 DRX on duration (i.e., the current DRX on duration) is skipped when no power saving signal is detected, thus, the monitoring density of the PDCCH is increased, signaling overhead is saved, and data delay is recuded.

In the method provided in the embodiments, when the first number N1 is equal to 1, the second number N2 is greater than 1, that is, the PDCCH monitoring in one DRX on duration (i.e., the current DRX on duration) when the power saving signal is detected, and the PDCCH monitoring in multiple DRX on durations is skipped when no power saving signal is detected, thus, the monitoring density of PDCCH is reduced, and the power saving degree is improved.

Figure 5:
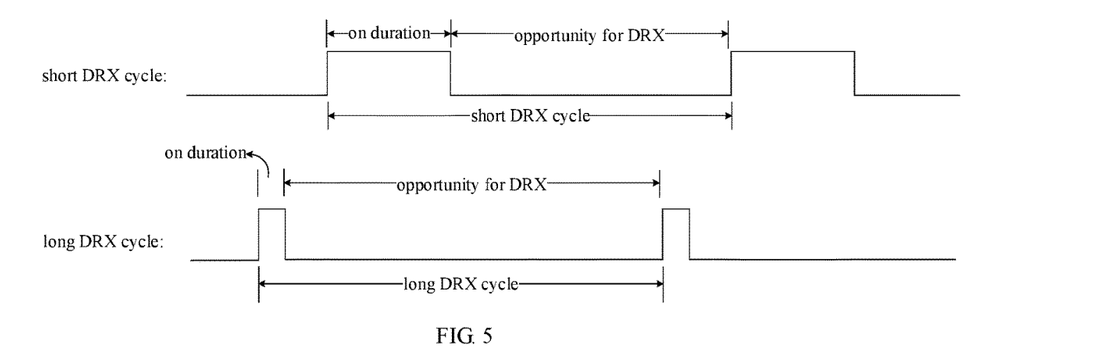
FIG. 5 is a schematic diagram illustrating a long cycle and a short cycle of a discontinuous reception (DRX) provided in an exemplary embodiment of the disclosure.

One DRX cycle is equal to a sum of a wake-up time period and a sleep time period of UE. The wake-up time period is a duration of the duration timer in one cycle, and the sleep time period is a duration of the opportunity for DRX in one cycle. In a communication system, the system can configure a short DRX cycle or a long DRX cycle for the UE according to different service scenarios. As shown in FIG. 5, a sleep time period of the long DRX cycle is longer than a sleep time period of the short DRX cycle.

Figure 6:
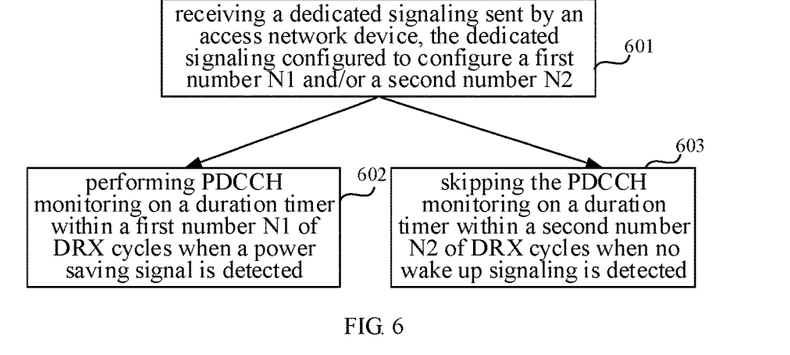
FIG. 6 is a flow chart illustrating a power saving method provided in another exemplary embodiment of the disclosure.

For the short DRX cycle and the long DRX cycle, the configuration modes of the first number N1 and the second number N2 are different. FIG. 6 is a flowchart illustrating a power saving method provided in another exemplary embodiment of the disclosure. Taking the terminal shown in FIG. 1 as an example, the method includes the following.

At block 601, a dedicated signaling sent by an access network device is received, the dedicated signaling is configured to configure the first number N1 and/or the second number N2.

Optionally, the dedicated signaling includes any one of: RRC signaling, an MAC CE, and DCI.

When the dedicated signaling is used to configure the first number N1 but not used to configure the second number N2, the second number N2 may also be implemented as a default value. For example: the second number N2 may be implemented as a default value 1. The second number N2 may also be implemented as the same default value as the first number N1.

The first number N1 is used to indicate the number of cycles of DRX on duration for monitoring the PDCCH when the power saving signal is detected. The second number N2 is used to indicate the number of cycles of DRX on duration where the monitoring of the PDCCH is skipped when no power saving signal is detected.

Optionally, the dedicated signaling is used to configure the first number N1 to be greater than 1, and configure the second number N2 to be 1; or, the dedicated signaling is used to configure the first number N1 to be 1, and to configure the second number N2 to be greater than 1.

Optionally, the long DRX cycle and the short DRX cycle are respectively configured with different first numbers N1; or, the long DRX cycle and the short DRX cycle are respectively configured with different second numbers N2; or, the long DRX cycle and the short DRX cycle are configured with different first numbers N1 and different second numbers N2.

Optionally, different entry modes of the short DRX cycle are respectively configured with different first numbers N1; or, different entry modes of the short DRX cycle are respectively configured with different second numbers N2; or, different entry modes of the short DRX cycle are respectively configured with different first numbers N1 and different second numbers N2.

Illustratively, the first number N1 and the second number N2 corresponding to the long DRX cycle are equal to 1. The first number N1 corresponding to the short DRX cycle is greater than 1. For example, the first number N1 corresponding to the short DRX cycle is 3. The second number N2 corresponding to the short DRX cycle is equal to 1. The short DRX cycle is a cycle entered after an inactivity timer expires.

Illustratively, the first number N1 and the second number N2 corresponding to the long DRX cycle are equal to 1. The first number N1 corresponding to the short DRX cycle is equal to 1. The second number N2 corresponding to the short DRX cycle is greater than 1. For example, the second number N2 corresponding to the short DRX cycle is 3. The short DRX cycle is a cycle entered after the UE receives a short MAC CE.

At block 602, PDCCH monitoring is performed on a duration timer within the first number N1 of DRX cycles when the power saving signal is detected.

Optionally, the first number N1 is a value configured through the foregoing dedicated signaling. The value of the first number N1 may be 1 or greater than 1.

When the power saving signal is detected, the PDCCH scheduling information (or known as PDCCH subframe) is monitored in the first number N1 of DRX on duration.

At block 603, the PDCCH monitoring is skipped for a duration timer within the second number N2 of DRX cycles when no power saving signal is detected.

Optionally, the second number N2 may be a value configured through the foregoing dedicated signaling, or may be a default value. The value of the second number N2 may be 1 or greater than 1.

When no power saving signal is detected, the PDCCH scheduling information (or known as PDCCH subframe) monitoring is skipped in the second number N2 of DRX on duration.

In conclusion, with the power saving method provided in the embodiments, by using the first number N1 and the second number N2 to respectively indicate the monitoring cycle when the power saving signal is detected and the skipping period when no power saving signal is detected, thus, the density of monitoring the PDCCH is adjusted, by adapting to different power-saving requirements with different monitoring densities, the effectiveness to save power of the terminal using the power saving signal is improved.

With the method provided in the embodiments, a large amount of data is usually intensively sent in the short DRX cycle after the inactive timer expires, therefore, in the short DRX cycle after the inactive timer expires, the first number N1 is configured to be greater than 1 and the second number N2 is configured to be equal to 1, which increases the monitoring density of the PDCCH and meets the data acquisition requirement of the inactive timer timeout.

With the method provided in the embodiments, data is usually sparsely transmitted in the short DRX cycle entered after the short MAC CE is received, therefore, in the short DRX cycle after the short MAC CE is received, the first number N1 is configured to be equal to 1 and the number second N2 is configured to be greater than 1, which meets the power saving requirement when receiving a short MAC CE.

Figure 7:
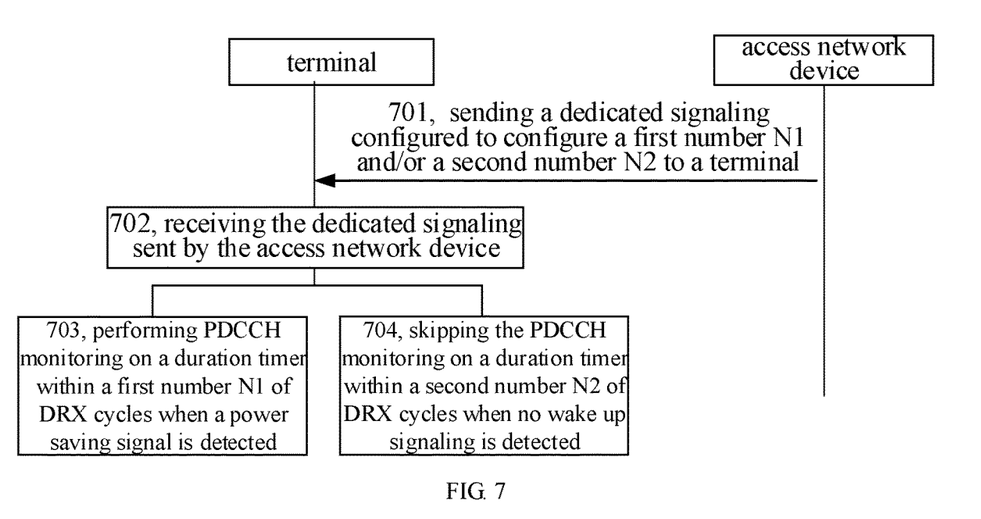
FIG. 7 is a flow chart illustrating a power saving method provided in another exemplary embodiment of the disclosure.

FIG. 7 is a flow chart illustrating a power saving method provided in another exemplary embodiment of the disclosure. In this embodiment, performing the method by the terminal and the access network device illustrated in FIG. 1 is taken as an example for description. As illustrated in FIG. 7, the method includes the following.

At block 701, the access network device sends a dedicated signaling to the terminal. The dedicated signaling is configured to configure a first number N1 and/or a second number N2.

Optionally, the dedicated signaling includes any of: a RRC signaling, an MAC CE signaling, and downlink control information DCI.

At block 702, the terminal receives the dedicated signaling sent by the access network device.

The first number N1 is configured to indicate performing physical downlink control channel (PDCCH) monitoring on a duration timer within the first number N1 of DRX cycles in response to detecting a power saving signal. The second number N2 is configured to indicate skipping the PDCCH monitoring on a duration timer within the second number N2 of DRX cycles in response to detecting no wake up signaling.

When the dedicated signaling is used to configure the first number N1 but not used to configure the second number N2, the second number N2 may also be implemented as a default value. For example: the second number N2 may be implemented as a default value 1. The second number N2 may also be implemented as the same default value as the first number N1.

Optionally, the dedicated signaling is used to configure the first number N1 to be greater than 1, and configure the second number N2 to be 1; or, the dedicated signaling is used to configure the first number N1 to be 1, and to configure the second number N2 to be greater than 1.

Optionally, the long DRX cycle and the short DRX cycle are respectively configured with different first numbers N1; or, the long DRX cycle and the short DRX cycle are respectively configured with different second numbers N2; or, the long DRX cycle and the short DRX cycle are configured with different first numbers N1 and different second numbers N2.

Optionally, different entry modes of the short DRX cycle are respectively configured with different first numbers N1; or, different entry modes of the short DRX cycle are respectively configured with different second numbers N2; or, different entry modes of the short DRX cycle are respectively configured with different first numbers N1 and different second numbers N2.

At block 703, the terminal performs PDCCH monitoring on a duration timer within the first number N1 of DRX cycles when the power saving signal is detected.

When the power saving signal is detected, the PDCCH scheduling information (or known as PDCCH subframe) is monitored in the first number N1 of DRX on duration.

At block 704, the terminal skips the PDCCH monitoring for a duration timer within the second number N2 of DRX cycles when no power saving signal is detected.

When no power saving signal is detected, the PDCCH scheduling information (or known as PDCCH subframe) monitoring is skipped in the second number N2 of DRX on duration.

In conclusion, with the power saving method provided in the embodiments, by using the first number N1 and the second number N2 to respectively indicate the monitoring cycle when the power saving signal is detected and the skipping period when no power saving signal is detected, thus, the density of monitoring the PDCCH is adjusted, by adapting to different power-saving requirements with different monitoring densities, the effectiveness to save power of the terminal using the power saving signal is improved.

Figure 8:
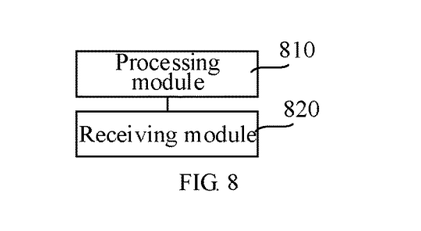
FIG. 8 is a block diagram illustrating a power saving apparatus provided in an exemplary embodiment of the disclosure.

FIG. 8 is a block diagram illustrating a power saving apparatus provided in an exemplary embodiment of the disclosure. The apparatus may be implemented as all or a part of a terminal by a software, a hardware or a combination thereof. The apparatus includes a processing module 810. The processing module 810 may be a hardware device such as a central processing unit or a baseband processor.

The processing module 810 is configured to perform PDCCH monitoring on a duration timer within a first number N1 of DRX cycles in response to detecting a power saving signal.

The processing module 810 is also configured to skip the PDCCH monitoring on a duration timer within a second number N2 of DRX cycles in response to detecting no wake up signaling.

The first number N1 and the second number N2 are identical or different.

In an optional embodiment, the first number N1 is a pre-configured value.

In an optional embodiment, a default value of the second number N2 is identical to the first number N1, or the default value of the second number N2 is 1.

In an optional embodiment, the apparatus further includes a receiving module 820. The receiving module 820 may be a hardware device such as a radio frequency (RF) antenna, etc.

The receiving module 820 is configured to receive a dedicated signaling sent by an access network device. The dedicated signaling is configured to configure the first number N1 and/or the second number N2.

The dedicated signaling includes any of: an RRC signaling, a MAC CE, and DCI.

In an optional embodiment, the first number N1 is greater than 1, and the second number N2 is equal to 1; or, the first number N1 is equal to 1, and the second number N2 is greater than 1.

In an optional embodiment, a long DRX cycle and a short DRX cycle are configured with different first numbers N1; or, the long DRX cycle and the short DRX cycle are configured with different second numbers N2; or, the long DRX cycle and the short DRX cycle are configured with different first numbers N1 and different second numbers N2.

In an optional embodiment, different entry modes of a short DRX cycle are configured with different first numbers N1; or, different entry modes of a short DRX cycle are configured with different second numbers N2; or, different entry modes of a short DRX cycle are configured with different first numbers N1 and different second numbers N2.

Figure 9:
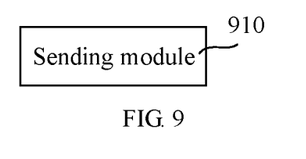
FIG. 9 is a block diagram illustrating a power saving apparatus provided in another exemplary embodiment of the disclosure.

FIG. 9 is a block diagram illustrating a power saving apparatus provided in another exemplary embodiment of the disclosure. The apparatus may be implemented as all or a part of an access network device by a software, a hardware or a combination thereof. The apparatus includes a sending module 910. The sending module 910 may be a hardware device such as an RF antenna, etc.

The sending module 910 is configured to send a dedicated signaling to a terminal. The dedicated signaling is configured to configure a first number N1 and/or a second number N2. The first number N1 is configured to indicate performing physical downlink control channel (PDCCH) monitoring on a duration timer within the first number N1 of DRX cycles in response to detecting a power saving signal. The second number N2 is configured to indicate skipping the PDCCH monitoring on a duration timer within the second number N2 of DRX cycles in response to detecting no wake up signaling The dedicated signaling includes any of: an RRC signaling, a MAC CE, and DCI. The first number N1 and the second number N2 are identical or different.

In an optional embodiment, the sending module 910 is further configured to send the dedicated signaling to the terminal, the dedicated signaling is configured to configure the first number N1.

The second number N2 is a default value.

In an optional embodiment, the first number N1 is greater than 1, and the second number N2 is equal to 1; or, the first number N1 is equal to 1, and the second number N2 is greater than 1.

In an optional embodiment, a long DRX cycle and a short DRX cycle are configured with different first numbers N1; or, the long DRX cycle and the short DRX cycle are configured with different second numbers N2; or, the long DRX cycle and the short DRX cycle are configured with different first numbers N1 and different second numbers N2.

In an optional embodiment, different entry modes of a short DRX cycle are configured with different first numbers N1; or, different entry modes of a short DRX cycle are configured with different second numbers N2; or, different entry modes of a short DRX cycle are configured with different first numbers N1 and different second numbers N2.

Figure 10:
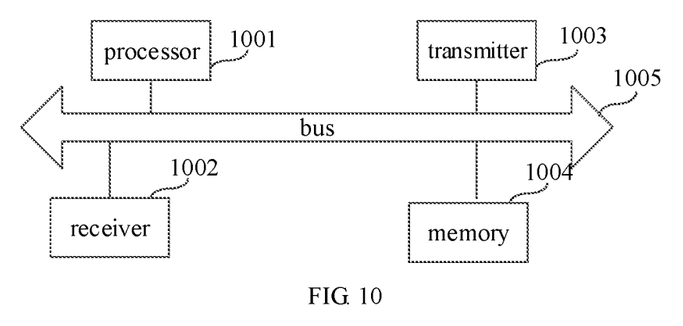
FIG. 10 is a schematic diagram illustrating a terminal provided in an exemplary embodiment of the disclosure.

FIG. 10 is a schematic diagram illustrating a terminal provided in an exemplary embodiment of the disclosure. The terminal includes a processor 1001, a receiver 1002, a transmitter 1003, a memory 1004 and a bus 1005.

The processor 1001 includes one or more processing cores, and the processor 1001 executes various function applications and information processing by running software programs and modules.

The receiver 1002 and the transmitter 1003 may be implemented as a communication component, which may be a communication chip.

The memory 1004 is connected to the processor 1001 through the bus 1005.

The memory 1004 may be configured to store at least one instruction, and the processor 1001 is configured to execute the at least one instruction to implement various actions in the above method embodiments.

In addition, the memory 1004 may be implemented by any type of temporary or non-temporary storage devices or their combination. The temporary or non-temporary storage devices include but are not limited to a magnetic disk or an optical disk, an electrically erasable programmable read-only memory (EEPROM), an electrically programmable read-only memory (EPROM), a static random access memory (SRAM), a read-only memory (ROM), a magnetic memory, a flash memory, a programmable read-only memory (PROM).

In some example embodiments, a non-transitory computer readable storage medium including instructions is further provided, such as a memory including instructions. The above instructions may be executed by the processor of the terminal to implement the above power saving methods. For example, the non-transitory computer readable storage medium may be a ROM, a random access memory (RAM), a CD-ROM, a magnetic tape, a floppy disk, an optical data storage device, etc.

A non-transitory computer readable storage medium is further provided. When the instructions in the non-transitory computer readable storage medium are executed by the processor of the terminal, the terminal is caused to execute the power saving method.

Figure 11:
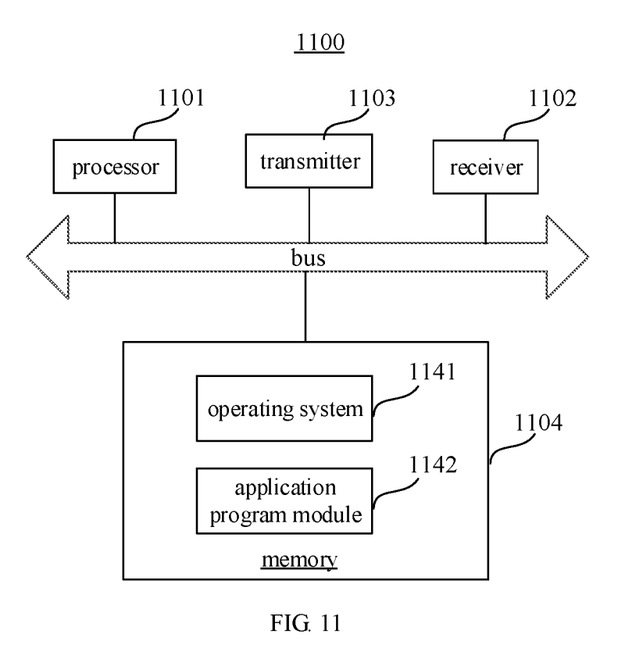
FIG. 11 is a schematic diagram illustrating an access network device provided in an exemplary embodiment of the disclosure.

FIG. 11 is a schematic diagram illustrating an access network device 1100 provided in an exemplary embodiment of the disclosure. The access network device 1100 may be a base station.

The access network device 1100 may include a processor 1101, a receiver 1102, a transmitter 1103 and a memory 1104. The receiver 1102, the transmitter 1103 and the memory 1104 are connected to the processor 1101 through a bus respectively.

The processor 1101 includes one or more processing cores, and the processor 1101 executes the methods executed by the access network device in the power saving method provided in embodiments of the disclosure by running software programs and modules. The memory 1104 may be configured to store software programs and modules. Specifically, the memory 1104 may store an operating system 1141, and an application program module 1142 required by at least one function. The receiver 1102 is configured to receive communication data sent by other devices, and the transmitter 1103 is configured to send communication data to other devices.

An example embodiment of the disclosure further provides a computer readable storage medium with at least one instruction, at least one program, a set of codes and a set of instructions stored thereon. The at least one instruction, the at least one program, the set of codes or the set of instructions are loaded and executed by the processor to implement the power saving method provided in the above method embodiments.

In the embodiments of the present disclosure, "multiple" refers to two or more.

Those skilled in the art may understand that all or part of actions in the above method embodiments may be implemented by hardware or by instructing relevant hardware by a program. The program may be stored in a computer readable storage medium, and the above-mentioned storage medium may be a read-only memory, a magnetic disk or an optical disc, etc.

The above descriptions are only preferred embodiments of the disclosure and are not configured to limit the present disclosure. Any modification, equivalent replacement, improvement etc. made within the spirit and principles of the disclosure shall be included in the protection scope of the present disclosure.

What is claimed is:

1. A power saving method, comprising:
performing, by a terminal, physical downlink control channel (PDCCH) monitoring on a duration timer within a first number N1 of DRX cycles in response to detecting a power saving signal; and,
skipping, by the terminal, the PDCCH monitoring on a duration timer within a second number N2 of DRX cycles in response to detecting no wake up signaling;
wherein the first number N1 and the second number N2 are identical or different;
receiving, by the terminal, a dedicated signaling sent by an access network device, wherein the dedicated signaling is configured to configure the first number N1 and/or the second number N2;
wherein, the dedicated signaling comprises any of: a radio resource control (RRC) signaling, a media access control (MAC) control unit (CE), and downlink control information (DCI);
wherein,
different entry modes of a short DRX cycle are configured with different first numbers N1;
or,
different entry modes of the short DRX cycle are configured with different second numbers N2;
or,
different entry modes of the short DRX cycle are configured with different first numbers N1 and different second numbers N2.

2. The method as claimed in claim 1, wherein the first number N1 is a pre-configured value.

3. The method as claimed in claim 1, wherein,
a default value of the second number N2 is identical to the first number N1;
or,
the default value of the second number N2 is 1.

4. The method as claimed in claim 1, wherein,
the first number N1 is greater than 1, and the second number N2 is equal to 1;
or,
the first number N1 is equal to 1, and the second number N2 is greater than 1;
or,
the first number N1 is greater than 1, and the second number N2 is greater than 1.

5. The method as claimed in claim 1, wherein,
a long DRX cycle and the short DRX cycle are configured with different first numbers N1;
or,
the long DRX cycle and the short DRX cycle are configured with different second numbers N2;
or,
the long DRX cycle and the short DRX cycle are configured with different first numbers N1 and different second numbers N2.

6. A power saving method, comprising:
sending, by an access network device, a dedicated signaling configured to configure a first number N1 and/or a second number N2 to a terminal, wherein the first number N1 is configured to indicate performing physical downlink control channel (PDCCH) monitoring on a duration timer within the first number N1 of DRX cycles in response to detecting a power saving signal, the second number N2 is configured to indicate skipping the PDCCH monitoring on a duration timer within the second number N2 of DRX cycles in response to detecting no wake up signaling;

wherein, the dedicated signaling comprises any of: a radio resource control (RRC) signaling, a media access control (MAC) control unit (CE), and downlink control information (DCI), the first number N1 and the second number N2 are identical or different;

wherein, different entry modes of a short DRX cycle are configured with different first numbers N1;

or, different entry modes of a short DRX cycle are configured with different second numbers N2;

or, different entry modes of a short DRX cycle are configured with different first numbers N1 and different second numbers N2.

7. The method as claimed in claim 6, wherein sending by the access network device the dedicated signaling configured to configure the first number N1 and/or the second number N2 to the terminal comprises:

sending, by the access network device, the dedicated signaling configured to configure the first number N1 to the terminal;

wherein the second number N2 is a default value.

8. The method as claimed in claim 6, wherein, the first number N1 is greater than 1, and the second number N2 is equal to 1;

or, the first number N1 is equal to 1, and the second number N2 is greater than 1;

or, the first number N1 is greater than 1, and the second number N2 is greater than 1.

9. The method as claimed in claim 6, wherein, a long DRX cycle and the short DRX cycle are configured with different first numbers N1;

or, the long DRX cycle and the short DRX cycle are configured with different second numbers N2;

or, the long DRX cycle and the short DRX cycle are configured with different first numbers N1 and different second numbers N2.

10. A terminal, comprising:

a processor; and a transceiver coupled to the processor;

wherein the processor is configured to load and execute executable instructions to implement a power saving method, the method comprising:

performing, by a terminal, physical downlink control channel (PDCCH) monitoring on a duration timer within a first number N1 of DRX cycles in response to detecting a power saving signal;

skipping, by the terminal, the PDCCH monitoring on a duration timer within a second number N2 of DRX cycles in response to detecting no wake up signaling;

wherein the first number N1 and the second number N2 are identical or different;

receiving, by the terminal, a dedicated signaling sent by an access network device, wherein the dedicated signaling is configured to configure the first number N1 and/or the second number N2;

wherein, the dedicated signaling comprises any of: a radio resource control (RRC) signaling, a media access control (MAC) control unit (CE), and downlink control information (DCI);

wherein, different entry modes of a short DRX cycle are configured with different first numbers N1;

or, different entry modes of the short DRX cycle are configured with different second numbers N2;

or, different entry modes of the short DRX cycle are configured with different first numbers N1 and different second numbers N2.

11. An access network device, comprising:

a processor; and a transceiver coupled to the processor;

wherein the processor is configured to load and execute executable instructions to perform the power saving method as claimed in claim 6.

12. A non-transitory computer-readable storage medium having stored therein at least one instruction, at least one program, a code set, or an instruction set, wherein the at least one instruction, the at least one program, the code set, or the instruction set is loaded and executed by a processor to implement the power saving method as claimed in claim 1.

13. The terminal as claimed in claim 10, wherein, a default value of the second number N2 is identical to the first number N1;

or, the default value of the second number N2 is 1.

14. The terminal as claimed in claim 10, wherein, the first number N1 is greater than 1, and the second number N2 is equal to 1;

or, the first number N1 is equal to 1, and the second number N2 is greater than 1;

or, the first number N1 is greater than 1, and the second number N2 is greater than 1.

15. The terminal as claimed in claim 10, wherein, a long DRX cycle and the short DRX cycle are configured with different first numbers N1;

or, the long DRX cycle and the short DRX cycle are configured with different second numbers N2;

or, the long DRX cycle and the short DRX cycle are configured with different first numbers N1 and different second numbers N2.

16. The method as claimed in claim 1, wherein a short DRX cycle or a long DRX cycle is configured for the terminal according to different services.

17. The method as claimed in claim 1, further comprising:

in response to a large amount of data being intensively sent in a short DRX cycle after an inactive timer expires, configuring the first number N1 to be greater than 1 and the second number N2 to be equal to 1 in the short DRX cycle after the inactive timer expires.

* * * * *